United States Patent Office 3,525,542
Patented Aug. 25, 1970

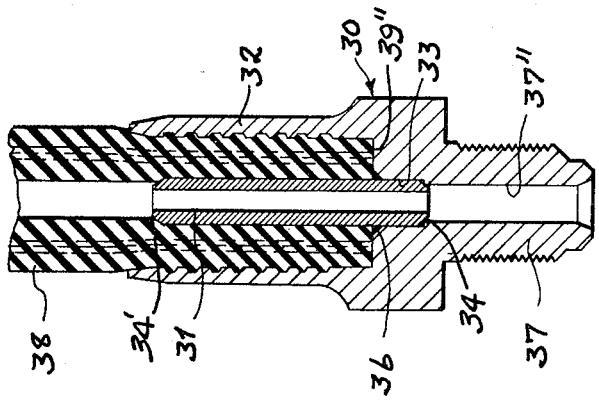
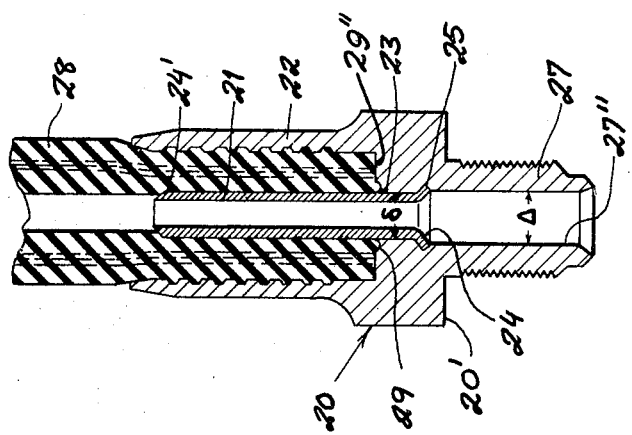
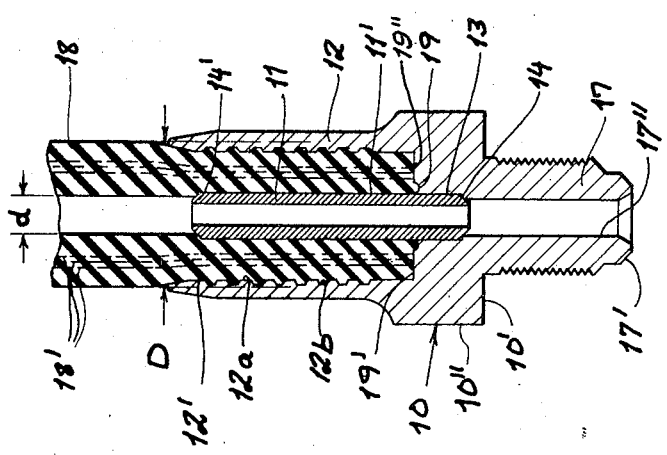

3,525,542
TUBE CONNECTOR
Juan Belart, Walldorf, and Horst Mogwitz, Konigstein, Germany, assignors to Alfred Teves Maschinen- und Armaturenfabrik KG., Frankfurt am Main, Germany, a corporation of Germany
Continuation of application Ser. No. 632,249, Apr. 20, 1967. This application Dec. 30, 1968, Ser. No. 789,655
Claims priority, application Germany, Dec. 1, 1966, T 32,648
Int. Cl. F16l 33/20; B21d 39/04
U.S. Cl. 285—256         1 Claim

ABSTRACT OF THE DISCLOSURE

Conduit connector for automotive hydraulic brake systems in which a tubular body of brass is formed unitarily with an outer sleeve and is provided with a press-fitted tubular mandrel received in the body coaxial with the sleeve and composed of steel and having a higher compressive strength than that of the outer sleeve while being spaced inwardly therefrom with annular clearance, whereby the conduit inserted into said clearance is radially clamped by the sleeve against the mandrel without deformation thereof.

---

This is a continuation of application Ser. No. 632,249 filed on Apr. 20, 1967, and now abandoned.

Our present invention relates to a tube connector for high-pressure tubing, conduits and pipes and, more particularly, to conduit connectors for use in high-pressure hydraulic or pneumatic installations.

It has already been proposed to provide connector sleeves and junctions for hydraulic and pneumatic pressure conduits and tubing with a sleeve portion adapted to surround the flexible tube and having a bayonet of thread formation engageable with a complementary formation upon the structure to which the tube is to be attached. Thus, when connectors of this type are to be used for joining two lengths of conduit together, the ends to be attached are formed with respective connector members having matingly interengageable formations, each of these having a sleeve portion into which the tube can be inserted and retained by cleaning, clamping bands or the like. In other arrangements, the tube is merely inserted onto a male formation of the fitting and clamped thereabout by a thighenable ring.

In still other arrangements, the fitting is provided with a relatively easily deformable sealing sleeve of brass or the like which is compressed around the tube. The external pressure, by which the outer sleeve is clamped around the tube, often suffices to deform any inner or core member onto which the tube is forced, thereby interfering with the throughflow of the fluid and diminshing the holding forces.

It is the principal object of the present invention to provide a tube connector for high-pressure installations in which the aforedescribed disadvantages can be avoided and which can be sealed rapidly with high pressures without interfering with the fluid-flow cross-section.

Another object of this invention is to provide a conduit connector which can be assembled onto high pressure tubing, especially for hydraulic brakes and like installations in a relatively simple and inexpensive manner and yet which is capable of withstanding the high pressures generated in such system without diminution of the flow cross-section.

These objects and others which will become apparent hereinafter are attained in accordance with the present invention by providing a tube connector having a generally tubular body with an axis and, at one end of this body, a formation for joining the connector to a cylinder housing or other structure, to a complementary conduit connector or to a hydraulic or pneumatic testing installation; the body is formed, in accordance with the principles of this invention, with an inner sealing sleeve, mandrel or core rigid with the body and an outer sealing sleeve unitary therewith and coaxially surrounding the inner sleeve while forming an annular clearance with the latter. The inner sleeve is bonded to the body and formed of a relatively nonyieldable or limitedly deformable material, e.g. steel, and has relatively high compressive strength whereas the remainder of the body and the outer sleeve are composed of a relatively yieldable and deformable material such as brass. At its free extremity, the inner sleeve is beveled along its outer edge to facilitate insertion of the flexible conduit or tube into the socket of the conduit connector, i.e. over the inner sleeve and within the outer one. Thereafter, the outer sleeve is clamped against the conduit and the mandrel formed by the inner sleeve so that, in effect, the flexible inner wall of the conduit conforms to the shape of the mandrel at its free extremity to permit the inner wall of the conduit to merge substantially without interruption with the inner wall of the mandrel.

According to a further feature of this invention, the body of the connector is formed with a throughgoing bore of a diameter corresponding to press-fitted engagement with the outer diameter of the mandrel, and the latter is seated in this bore at its fixed end by press-fitting the mandrel into the bore of the connector.

The above and other objects, features and advantages of the present invention will become more readily apparent from the following description, reference being made to the accompanying drawing in which:

FIGS. 1 through 3 are axial cross-sectional views through three embodiments of this invention.

In FIG. 1 of the drawing we show a pipe connector according to this invention which comprises a generally tubular body 10 having a threaded tubular connecting projection 17 extending axially from the body 10 and adapted to be screwed into a female connecting member or a seat or fitting in a housing. Thus, for example, the conduit connector of this invention can be used to join a flexible conduit or tube to the cylinder housing of the wheel cylinders of an automotive brake system, to the master cylinder housing of this brake arrangement or to the housings of the driving and driven parts of any other hydraulic installation.

Generally, the shoulder 10′ of the nut portion 10″, whose prismatic configuration permits the connector to be driven home with a wrench or other means, clamps a sealing ring or washer against the marginal portions of the housing surrounding the inlet or outlet port of the hydraulic installation in which the connector is used.

The projecting threaded portion 17 is beveled at 17′ to seat against a complimentary surface within the inlet or outlet portion and thereby provide a further leakage-preventing seal. The projection 17 is formed unitarily with the nut 10″ and with an outer sleeve 12 of relatively thin-wall construction, i.e. with a wall thickness substantially less than that of the tubular portion 17.

The interior of the sleeve 12 is of stepped diameter to provide a face 19′ transverse to the axis of the connector and a bore 13 whose diameter exceeds slightly the diameter of the bore 17″ through the tubular portion 17 but is, in turn, less than the diameter D of the interior of the sleeve 12 prior to the clenching of the latter around the flexible conduit 18 which is to be received therein. Coaxial with the sleeve 12 and extending through the latter from the body 10 of the connector is a tubular mandrel or inner sleeve 11 which is anchored in the bore 13 by press-fitting at elevated pressure into the latter. Thus, in assembling the connector, the bore 13 has a diameter slightly less than that of the inner sleeve or mandrel 11 and the latter is forced axially into the socket formed by the bore 13 at hydraulic-press pressure. To facilitate insertion of the inner sleeve 11 into the socket formed by the bore 13, we provide this inner sleeve with a beveled forward end 14. The sleeve 11 extends from the socket 13 toward its free end 14' which is also beveled so as to facilitate insertion of the inner sleeve in the interior of the conduit 18 when the latter is forced into the outer sleeve 12. To insure a tight fit, the inner sleeve 11 is dimensioned with an outer diameter which exceeds slightly the inner diameter $d$ of the conduit 18 even prior to clenching of the outer sleeve 12.

The inner wall of the outer sleeve 12 is formed with a serrated, corrugated or helicoidally grooved inner peripheral wall 12' which is constituted of generally annular ridges 12a and intervening grooves 12b. The high-pressure conduit 18, in turn, is composed of an elastomeric materal into which a plurality of layers 18' of reinforcing fabric are embedded to limit outward deformation of the conduit.

According to the principles of this invention, the connector 10 can be assembled by press-fitting the mandrel or core 11 into the socket 13 and then clenching at a place by a deformation of the surrounding material at the wall 19' radially against this mandrel as represented at 19 by formation of a circular groove around this mandrel 11. This clinching action forms a fillet which radially clenches the harder mandrel and materially increases the strength with which the mandrel 11 is held in place. In addition to the clenching action of this fillet the frustoconical end face or extremity 14 of the mandrel 11 bears upon the circular edge of the right-angle shoulder defining the step between the small-diameter portion and the intermediate-diameter portion of the bore extending through the body 10 to hold this mandrel 11 securely in place. The mandrel is composed in accordance with the present invention of a material having a relatively high resistance to deformation and compression strength and can be formed from steel while the body 10 is composed of a somewhat softer, relatively deformable material of lesser compression strength. A suitable material for this purpose is brass.

The outer surface 11' of the mandrel 11 is smooth so that the end of the conduit 18 can be readily forced over the mandrel 11 and against the abutment surface 19' after clenching at 19 has locked the mandrel 11 in place. Then the outer sleeve 12 is radially compressed against the tube 18 and sandwiches the latter tightly between the non-deformed core 11 and the outer sleeve 12. The lengths of mandrel 11 are severed serially from a continuous tube blank by a parting tool which simultaneously forms the beveled edges 14 and 14'. This method of forming the mandrels 11, by turning the blank against the radially fed parting tool avoids deformation and stress upon the mandrel during its manufacture and facilitates its insertion into the body 10 without further treatment.

In FIG. 2, we show another pipe connection in which the body 20 is formed with the threaded projecting portion 27 in the manner previously described and has a shoulder 20' adapted to retain a washer in place at the outlet or inlet port in which the connector is mounted. In this case, however, the mandrel 21, which is beveled at its free end 24' is flared outwardly at its fixed end 24 and is locked in an annular groove 25 between the socket bore 23 and the bore 27" of the projection 27. In this case, the bore 27" has a diameter $\Delta$ somewhat larger than the diameter of the mandrel 21 while the diameter $\delta$ of the socket portion 23 is slightly smaller than the outer diameter of the mandrel. We have found it to be advantageous, moreover, to dimension the groove 25 so that it is of a larger diameter than the bore 27". Thus, the mandrel 21 can be forced axially into the body 20 through the bore 27" and force-fitted into the socket 23 until the flared end 24 steps into the groove 25. Alternatively, a forming tool of conical configuration and of the type commonly used in flaring pipes can be inserted to form the flared portion 24 after the mandrel 21 is press-fitted into the socket 23. The flared portion 24 thus merges with the wall of bore 27" to ensure fluid flow past the groove 25 without resistance. Upon insertion of the mandrel 21 the material of body 20 can be clenched therearound at 29 in the manner previously described. The high-pressure tube 28 can be inserted over the mandrel 21 and into the sleeve 22 which is compressed around and clamps the tube 28 as previously discussed.

The modification of FIG. 3 is generally similar to the system described in connection with FIG. 1 although here the steel tube 31 is press-fitted into the socket 33 coaxially with the bore 37" of the threaded projection 37 and is held in the body 30 additionally by a brazing or soldering fillet 36 in place of the clenching 19 and 29. The outer sleeve 32 of the brass connector 30 clamps the tube 38 against the relatively harder mandrel by radial pressure without deforming the mandrel. Thus, in all three systems the throughflow cross-section, tightness of seal and mechanical strength of the junction are maintained without any of the disadvantages characterizing earlier connectors having clenched outer sleeves.

As clearly apparent from the drawing, each mandrel 11, 21, 31 is axially confined between two seats confronting its lower end 14, 24, 34 and its upper end 14', 24', 34', respectively, the first seat being formed by an annular recess in the small-diameter portion 17", 27", 37" of the throughgoing bore while the second seat is provided through a resilient deformation of the elastomeric conduit 18, 28, 38 inserted into the clearance between the upper extremity of the mandrel and the surrounding sleeve portion 12, 22, 32 defining the large-diameter portion of the bore. Since the conduit is firmly gripped by the corrugated profile of the inner sleeve wall while resting against a transverse face 19", 29", 39" of the surrounding body, these two seats tend to hold the mandrel in position even in the absence of a positive anchorage (24, FIG. 2) or a soldered connection (36, FIG. 3). It will further be noted that the small-diameter bore portion 17", 27", 37", into which the lower extremity of the mandrel is press-fitted, widens at the top into an annular groove at the level of face 19", 29", or 39", this groove being occupied by solder 36 in FIG. 3 whereas in the other two embodiments the end of conduit 18 or 28 is seen to be wedged into same, thereby further solidifying the connection.

We claim:
1. A conduit connector for high-pressure installations, comprising:
  a tubular body with a throughgoing axial bore having a small-diameter portion terminating at one end of said body and a large-diameter portion terminating at the other end of said body, and a cylindrical intermediate-diameter portion between said large- and small-diameter portions, said small- and intermediate-diameter portions being separated by a shoulder having an inner circular right-angle edge and lying in a plane substantially perpendicular to the axis of said bore, and said large- and intermediate-diameter portions being separated by a transverse internal face of said body turned away from said small-diameter portion;
  a cylindrical relatively hard tubular mandrel of uniform cross section in said bore having a first extremity press-fitted in said intermediate-diameter portion and a second extremity projecting axially from said internal face into said large-diameter portion, the latter being bounded by an inner peripheral wall surface of said body having a corrugated profile and surrounding said second extremity with clearance, said first extremity having a frustoconical end face axially tapering toward said small-diameter portion and bearing on said edge of said shoulder in line contact therewith, said body being formed at said internal face around said mandrel with an annular groove spaced from said mandrel and defining a clenching fillet radially engaging around said mandrel, said mandrel being made of a harder material than said body and having an external diameter greater than that of said intermediate-diameter portion and smaller than that of said large-diameter portion; and a conduit of elastomeric material tightly received in said clearance and terminating at said face, said conduit being resiliently clamped by said corrugated profile against said second extremity of said mandrel.

References Cited

UNITED STATES PATENTS

| | | | |
|---|---|---|---|
| 2,017,154 | 10/1935 | Larkin | 29—525 X |
| 2,024,507 | 12/1935 | Brunner. | |
| 2,090,251 | 8/1937 | Cowles | 29—520 X |
| 2,095,885 | 10/1937 | Moreira et al. | 29—520 |
| 2,133,313 | 10/1938 | Weatherhead. | |
| 2,328,298 | 8/1943 | Santhoff. | |
| 2,535,460 | 12/1950 | Rotter et al. | |
| 2,971,780 | 2/1961 | Bauer. | |

FOREIGN PATENTS

| | | |
|---|---|---|
| 1,092,737 | 11/1960 | Germany. |
| 1,022,721 | 3/1966 | Great Britain. |
| 703,291 | 2/1931 | France. |

THOMAS F. CALLAGHAN, Primary Examiner

U.S. Cl. X.R.

29—509, 520